(No Model.)
H. AUGUSTINE.
AXLE LUBRICATOR.
No. 365,223. Patented June 21, 1887.
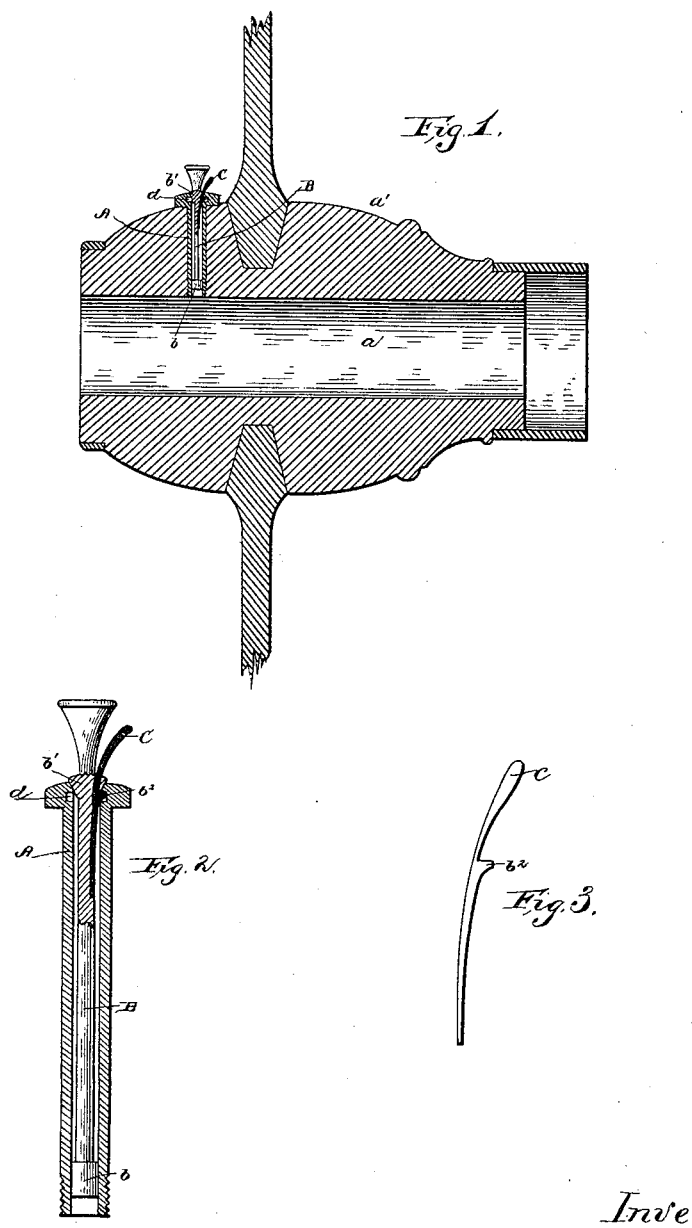
Witnesses:
John Onders Jr.
Thota M Gill.
Inventor:
Halvor Augustine,
By
Myers Lee
Attorneys.

UNITED STATES PATENT OFFICE.

HALVOR AUGUSTINE, OF SIOUX FALLS, DAKOTA TERRITORY.

AXLE-LUBRICATOR.

SPECIFICATION forming part of Letters Patent No. 365,223, dated June 21, 1887.

Application filed April 16, 1887. Serial No. 235,096. (No model.)

*To all whom it may concern:*

Be it known that I, HALVOR AUGUSTINE, a citizen of the United States of America, residing at Sioux Falls, in the county of Minnehaha and Territory of Dakota, have invented certain new and useful Improvements in Axle-Lubricators, of which the following is a specification, reference being had therein to the accompanying drawings.

This invention pertains to certain new and useful improvements in axle-lubricators; and it consists in the detailed construction, combination, and arrangement of the parts, substantially as hereinafter fully set forth, and particularly pointed out in the claims.

In the accompanying drawings, Figure 1 is a sectional view of a portion of a wheel with my invention applied thereto. Fig. 2 is similar view of the device detached, and Fig. 3 is a detail view of the spring-catch.

The object of this invention is to provide means for supplying lubricant to the axle of a vehicle-wheel without the necessity of removing such wheel for that purpose; and to this end the invention consists of a hollow tube or cylinder, A, screw-threaded at its lower end, whereby the same is secured in a female screw-threaded aperture in the sheathing or boxing $a$ of the hub $a'$, through an aperture of which said tube or cylinder is passed. The upper projecting end of the tube or cylinder A is of hexagonal or other polygonal shape, whereby the same can by means of a wrench be secured in place, causing its screw-threaded end to enter the corresponding aperture of the sheathing or boxing $a$, as before stated.

B is a long rod having a piston-head-like lower end, $b$, designed to fit snugly the inner circumference of the tube or cylinder, and to this rod is secured the lower inner end of a spring-catch, C, which extends up through an aperture formed in a beveled projection or shouldered portion, $b'$, causing its upper end to project nearly on a line with the upper end of the tube, as shown. This spring has a small stud or projection, $b^2$, formed on its outer surface, which is designed to enter a continuous recess or aperture, $d$, extending entirely around the upper shouldered end of the tube or cylinder.

In practice, when it is desired to supply the tube or cylinder with suitable lubricant, the same is accomplished by first pressing inwardly on the upper projecting end of the spring-catch, which will free the stud or projection thereof from contact with the upper wall of the recess or aperture $d$, permitting of the withdrawal of the rod B, after which the lubricant is passed into the tube or cylinder. This being accomplished, the rod is replaced in the tube or cylinder, and by means of its piston-head end the escape of the lubricant during the revolution of the wheel is prevented, the advantages of which are obvious.

I am aware that it is not new to provide an axle-lubricator with a shaft having a piston-head fitting within a cylinder and having an extension projecting from said piston-head; also, an axle-lubricator composed of a box having an enlargement and an axial opening, and a pan having a locking-spring and a connecting slot; hence I do not claim such construction, my invention being designed as an improvement thereon.

I claim as my invention—

1. In an axle-lubricator, the combination, with the tube or cylinder passed through and secured in the wheel-hub and having a recess or aperture, of the rod having a piston-head on one end, and the spring secured to said rod, having a stud or projection and passed through an aperture formed in a beveled portion of said rod, substantially as shown and described, the headed end of said rod being projected beyond the surface of the wheel-hub, as shown.

2. The combination, with the tube or cylinder having a continuous recess or aperture in its upper end, of the rod having the piston-head end, and the spring-catch having a stud or projection entering said recess or aperture, substantially as shown, and for the purpose set forth.

In testimony whereof I affix my signature in presence of two witnesses.

HALVOR AUGUSTINE.

Witnesses:
STEPHEN OLNEY,
H. L. GREENE.